US008622374B2

(12) United States Patent
Kieffer

(10) Patent No.: US 8,622,374 B2
(45) Date of Patent: Jan. 7, 2014

(54) BUFFER FOR ABSORBING IMPACTS

(75) Inventor: Gerhard Kieffer, Ruppichterroth (DE)

(73) Assignee: Acla-Werke GmbH, Cologne (DE)

( * ) Notice: Subject to any disclaimer, the term of this patent is extended or adjusted under 35 U.S.C. 154(b) by 239 days.

(21) Appl. No.: 13/037,744

(22) Filed: Mar. 1, 2011

(65) Prior Publication Data

US 2011/0227264 A1 Sep. 22, 2011

(30) Foreign Application Priority Data

Mar. 17, 2010 (EP) ..................................... 10156769

(51) Int. Cl.
*F16M 1/00* (2006.01)
(52) U.S. Cl.
USPC .......................... 267/140; 267/153; 267/141.1
(58) Field of Classification Search
USPC ........ 267/145, 153, 140.4, 141.4, 141.5, 140; 187/343, 344
See application file for complete search history.

(56) References Cited

U.S. PATENT DOCUMENTS

| 4,515,248 | A | | 5/1985 | Ohta | |
|---|---|---|---|---|---|
| 4,886,256 | A | * | 12/1989 | Nishiyama et al. | 267/221 |
| 5,419,539 | A | * | 5/1995 | Bressler | 267/292 |
| 5,641,248 | A | * | 6/1997 | Arlt, III | 405/195.1 |
| 6,085,878 | A | * | 7/2000 | Araki et al. | 188/377 |
| 7,178,796 | B2 | * | 2/2007 | Love et al. | 267/292 |
| 2008/0289909 | A1 | * | 11/2008 | Kato et al. | 187/343 |

FOREIGN PATENT DOCUMENTS

SU 1 081 105 A1 3/1984
WO 2007/070208 A2 6/2007

OTHER PUBLICATIONS

European Search Report dated Aug. 18, 2010 corresponding to European Patent Application No. 10 156 769.1, 1 page.
InTouch: Information on Flexible Polyurethane Foam. vol. 3: Mar. 1, 1993. Polyurethane Foam Association, Inc., 4 pages.

* cited by examiner

*Primary Examiner* — Bradley King
(74) *Attorney, Agent, or Firm* — Maier & Maier, PLLC

(57) ABSTRACT

In a buffer for absorbing impacts, which comprises an elastic buffer element made of a material having a first e-module, and a force take-up axis, the buffer element being compressible at least in the direction of said force take-up axis, it is provided that at least one additional element having a second e-module is enclosed in said buffer element, the second e-module being larger than the first e-module.

14 Claims, 3 Drawing Sheets

BUFFER FOR ABSORBING IMPACTS

RELATED APPLICATIONS

This application is the U.S. national stage application which claims priority under 35 U.S.C. §119, to European Patent Application No.: 10 156 769.1, filed on Mar. 17, 2010, the disclosure of which is incorporated by reference herein its entirety.

BACKGROUND OF THE INVENTION

1. Field of the Invention

The present invention relates to a buffer for absorbing impacts according to the precharacterizing part of claim 1.

2. Description of the Prior Art

Buffers of the type heretofore used for impact absorption consist of a volume-compressible, elastic buffer element having a first e-module. These buffers are e.g. buffers for an elevator cab or for use as a counterweight of an elevator cab. The buffers provided for such purposes are referred to as detachable bumpers. Such buffers are frequently installed in the pit of an elevator shaft.

The buffer could also be used as a safety buffer in crane building, or as a buffer in the automotive field.

Conventional buffers as heretofore used have the disadvantage that their constructional height is relatively large. In recent years, however, continuous efforts are undertaken, e.g. in the installation of elevators, to reduce the size of the shaft pit.

Thus, it is an object of the invention to provide a buffer of the initially described type which has a lower constructional height while at the same time having at least the same energy absorption capacity.

SUMMARY OF THE INVENTION

According to the invention, the above object is achieved by the features defined in claim 1.

The invention advantageously provides that at least one additional element is enclosed in the buffer element, that said at least one additional element has a second e-module, and that said second e-module of the additional element is larger than said first-mentioned e-module of the buffer element.

The above features have the advantage of allowing for a reduction of the constructional height of the buffer in comparison to the state of the art while the buffer still has the same energy absorption capacity or a higher energy absorption capacity.

Said additional element can be elastic. This property offers the advantage that also the additional element can undergo the deformations of the buffer which are generated by the applied forces.

The additional element can be elastically deformable by 300-700%, preferably by 400-600%.

Said buffer element has a first compression module and the additional element has a second compression module, the second compression module being larger than the first compression module. This means that the buffer element is more volume-compressible than the additional element.

Preferably, the additional element is incompressible in volume.

The additional element can be a frustum of a circular cone, while the base surface of the additional element can extend orthogonally to the force take-up axis of the buffer element. This has the advantage that the constructional height can be further reduced, while the energy absorption capacity remains constant or can be further increased.

The lateral surfaces of the additional element can extend at an angle from 20° to 80°, preferably from 30° to 60°, relative to force take-up axis of the buffer element. It has become evident that an angle which is in the range from 40° to 50° and preferably is 45°, is especially advantageous.

The additional element can be a frustum of a circular cone. Particularly, this is advantageous for a effecting a uniform distribution of forces within the buffer element.

The additional element can be formed as a hollow truncated cone.

It can be provided that at least two additional elements spaced from each other in the longitudinal direction of the buffer element are enclosed in the buffer element.

The buffer element can be made of a foamed plastic material. The buffer element can be volume-compressible by 80 to 90%.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing wherein the following is schematically shown.

DETAILED DESCRIPTION OF PREFERRED EMBODIMENTS

Figure 1:
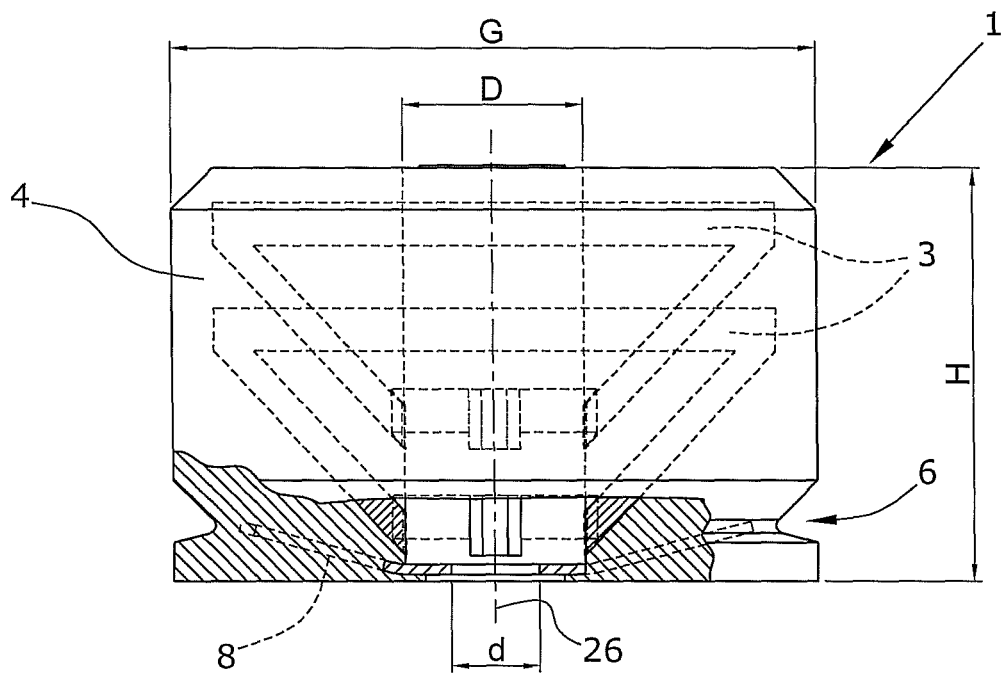
FIG. 1 is a sectional lateral view of a buffer for absorbing impacts.

In FIG. 1, a buffer 1 for absorbing impacts is shown in lateral view. Buffer 1 has a cylindrical shape. Further, buffer 1 comprises a buffer element 4. Said buffer element 4 is elastic and volume-compressible. Preferably, buffer element 4 is compressible by up to 80 to 90% in the force direction. Further, buffer element 4 preferably comprises an air content from 60 to 70%. Buffer element 4 is made of a foamed plastic material. With preference, buffer element 4 is made of a foamed polyurethane elastomer.

In the presently described embodiment, buffer element 4 comprises two additional elements 3. Said additional elements 3 are enclosed within buffer element 4. The additional elements 3 are arranged within buffer element 4 in a floating manner. Each of the additional elements 3 has the shape of the hollow frustum of a circular cone. The additional element is preferably a frustum of a right circular cone. The cone axis of the frustum of a circular cone extends along the longitudinal axis 26 of buffer element 4. The force to be introduced into the buffer 1 will be introduced thereinto along a preferably vertical force introduction axis. Said force introduction axis extends into the longitudinal axis 26 of buffer element 4. The two additional elements 3 are arranged at a distance from each other in the direction of the longitudinal axis 26 of buffer 1.

Of course, also more than two additional elements 3 can be arranged in buffer element 4.

The buffer 1 illustrated in FIG. 1 is formed as a hollow cylinder. Buffer 1 is provided with a throughgoing hole having an inner diameter D, an outer diameter G and a height H. By way of alternative, buffer 1 could also be formed as a solid cylinder. According to further alternatives, buffer 1 could be formed as a solid prism or also a hollow prism. According to a still further alternative, buffer 1 could have an elliptic cross-sectional area.

Internally of buffer element 4, a perforated plate 2 with holes 8 is arranged in the region of the base surface. Said perforated plate 2 is provided for fastening the buffer 1. By way of alternative, buffer 1 could also have no perforated plate 2 and instead be fastened by bonding. The perforated plate 2 comprises a bore having a diameter d. Preferably, this bore of perforated plate 2 is arranged concentrically within said throughgoing hole of buffer 1.

Figure 2:
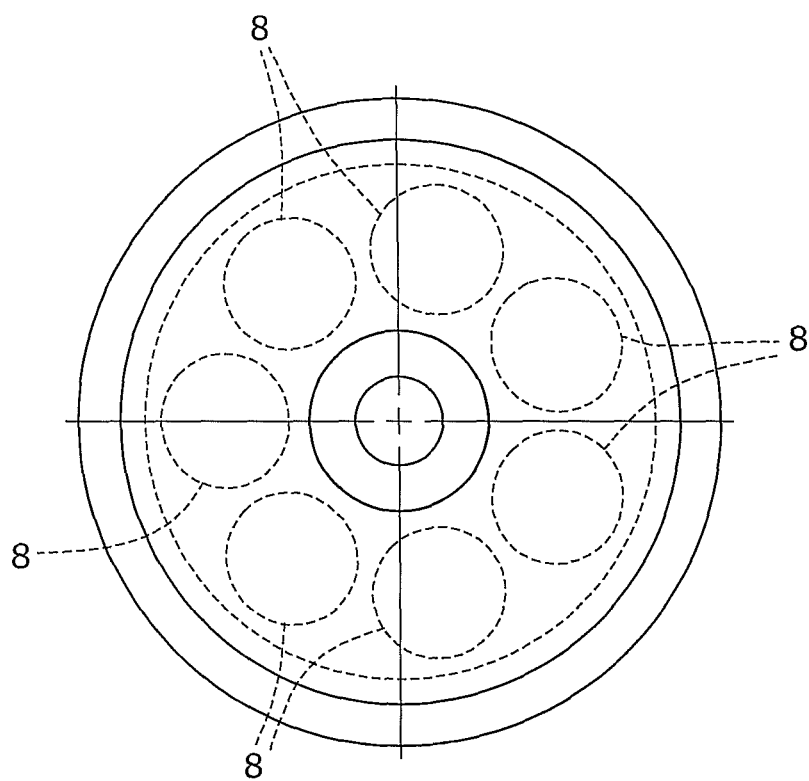
FIG. 2 is a plan view of the buffer of FIG. 1.

FIG. 2 is a plan view of the embodiment shown in FIG. 1. Shown in FIG. 2 is also that portion of perforated plate 2 which is arranged within buffer 1, said portion being represented in interrupted lines. The holes 8 of perforated plate 2 are clearly visible. Also the cylindrical shape of buffer 1 can be recognized in this Figure. The additional elements 3 are not depicted in FIG. 2.

Figure 3:
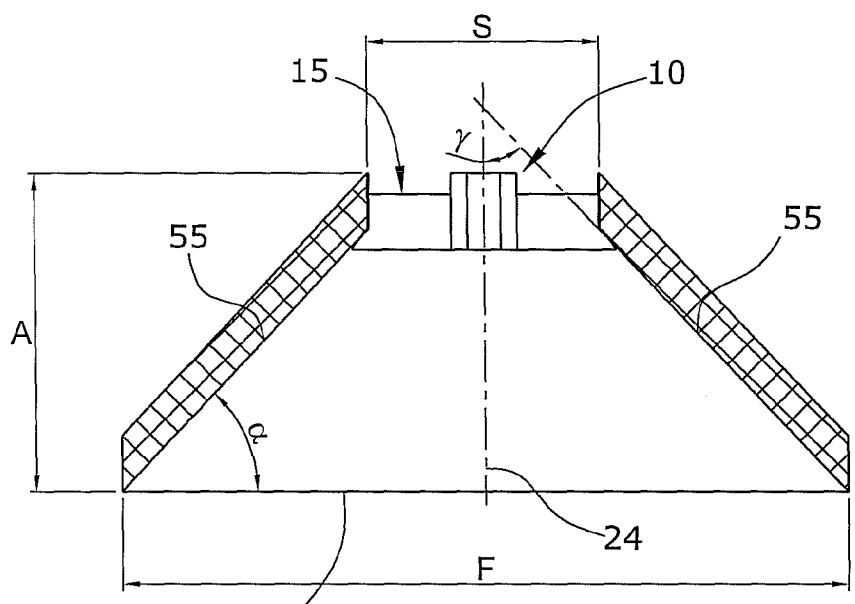
FIG. 3 is a sectional lateral view of an additional element.
Figure 4:
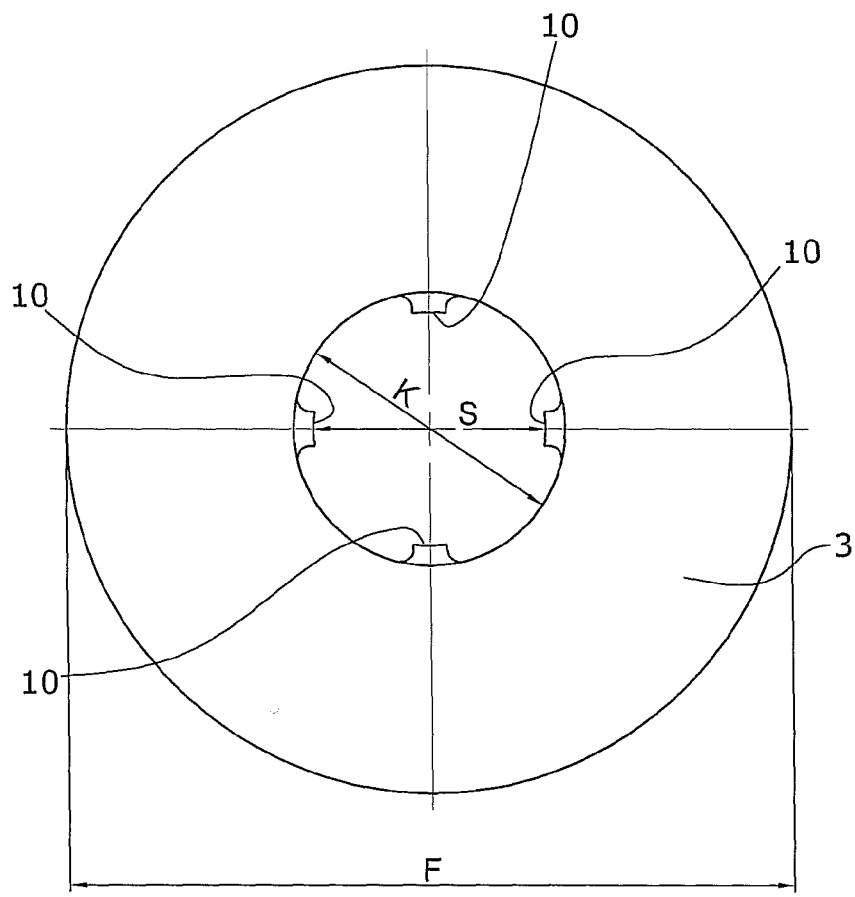
FIG. 4 is a plan view of the additional element of FIG. 3.

FIGS. 3 and 4 illustrate an additional element 3. The additional element 3 has a higher e-module than the buffer element 4. The additional element 3 further has a higher compression module than the buffer element 4. Preferably, the additional element 3 is incompressible in volume. The additional element 3 can be made e.g. of a homogeneous polyurethane elastomer. Alternatively, additional element 3 can be made of any other material, provided that the requirements to elasticity are fulfilled. The additional element 3 has to be deformable to an extent allowing it to follow the deformations of buffer element 4 when a force is applied. In FIG. 3, the additional element 3 is depicted as a linear, hollow, rotationally symmetrical truncated cone. Said truncated cone comprises a base surface 25 having an outer diameter F, and a top surface 15 having an inner diameter K and S, respectively. However, also other types of truncated cones could be used. For instance, the base and top surfaces of the truncated cone could be polygonal, round or elliptic.

In case of a polygonal base surface, the truncated cone is pyramid-shaped. The additional element 3 can also be an frustum of an oblique circular cone.

For producing the buffer of the invention as depicted in FIG. 1, a core having a diameter D will be centrally placed in a cylindrical mold having a diameter G. The two additional elements 3 and the perforated plate 2 will be arranged coaxially on said core. In a further step, plastic will be introduced into the core and be foamed. To allow for a uniform distribution of the foaming plastic within said mold, the perforated plate 2 comprises holes 8. Further, the outer diameter F of the additional element 3 is smaller than the outer diameter G of the buffer 1. Further, on the top surface 15, the truncated-cone-shaped additional elements 3 comprise projections 10 extending radially inwardly. With the aid of said projections 10, the additional elements 3 are arranged in abutment on the core inserted in the injection mold. Thus, the foamed plastic can also pass between the projections 10, which enhances the distribution of the foaming plastic.

Figure 5:
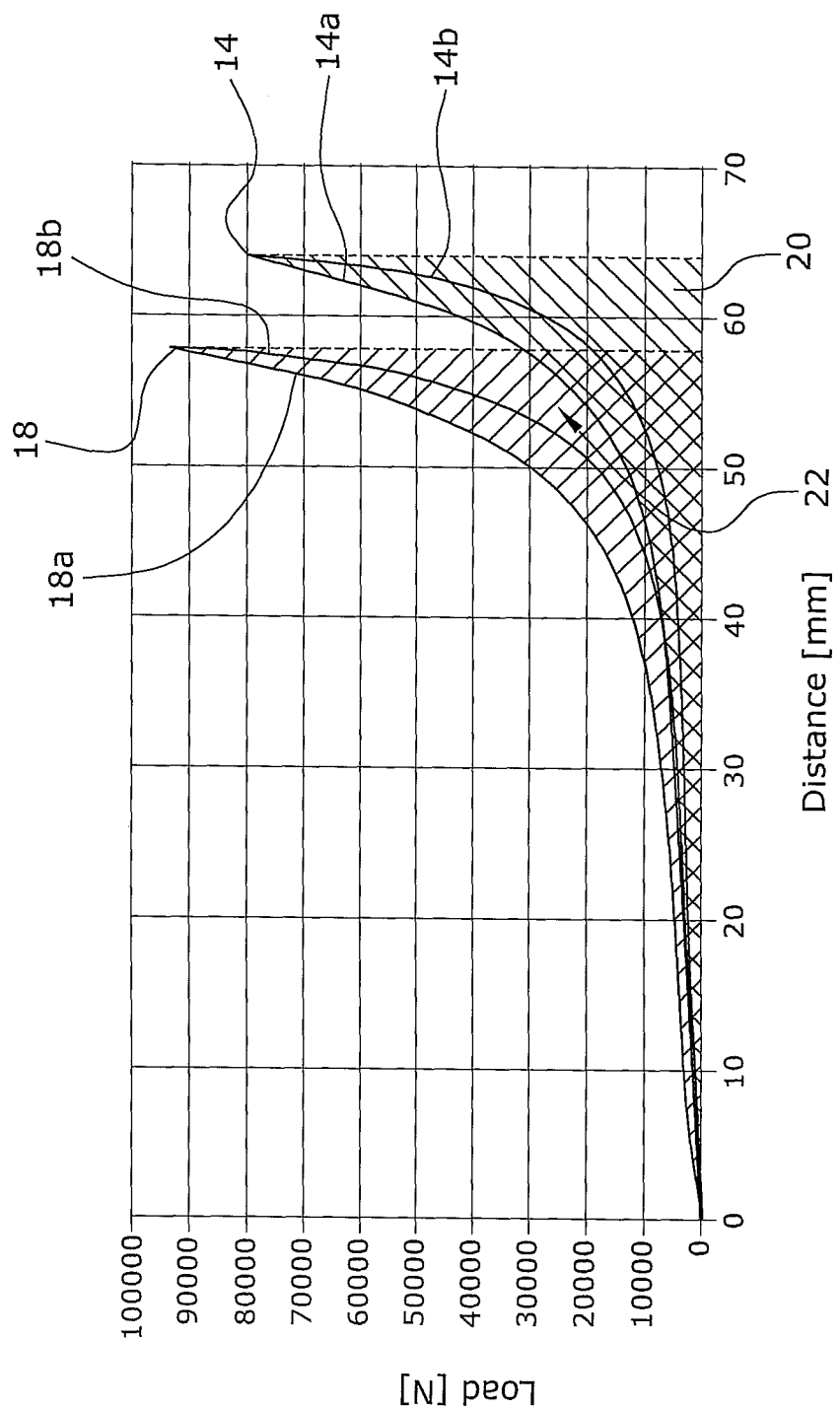
FIG. 5 is a diagram with characteristic lines of a buffer comprising two additional elements and of a buffer without additional elements.

The coaxially arranged additional element 3, which is illustrated in greater detail in FIGS. 3 and 4, comprises an angle γ relative to the cone axis 24 and thus—when the additional element 3 has been enclosed within buffer element 4—relative to the force introduction axis. Said angle γ preferably is in a range from 20 to 80° and from 30 to 60°, respectively. Especially preferred is an angle γ of 45°. The shape of additional element 3 and particularly the angle that the side surfaces 55 within buffer element 4 assume relative to the force introduction axis, have a considerable influence on the development of the characteristic line of the buffer as shown in FIG. 5. Preferably, the additional element 3 is arranged within buffer element 4 in such a manner that the axis of the truncated cone extends along the vertical force introduction axis. When viewed in the direction of the force introduction, the top surface 15 can be arranged before or behind the base surface 25.

FIG. 5 is a load-distance diagram of buffer 1. Shown in this load-distance diagram is a buffer characteristic line 18 of a buffer having a configuration similar to that of buffer 1 of FIGS. 1 and 2. Further shown is the buffer characteristic line 14 of a buffer comprising only a perforated plate but no additional elements 3. During force introduction, the buffers will be compressed. The distance by which the respective buffer is compressed is plotted on the x-axis. The force required therefor is plotted on the y-axis. The work, i.e. the energy taken up by the buffer, is represented by the surface below the respective characteristic line. The buffer comprising the two additional elements 3 and having the characteristic line 18 will take up the energy represented by the surface 22. The buffer having the characteristic line 14 will take up the energy represented by the surface 20. Both of these buffer characteristic lines comprise a hysteresis curve.

From the load-distance diagram, it can be easily seen that, while the taken-up energy remains constant, the distance by which the buffer with two additional elements is compressed, is considerably smaller. This has the advantage that the buffers which comprise an additional element 3 according to the present description, have a distinctly smaller constructional height.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A buffer for absorbing impacts, said buffer comprising an elastic buffer element made of a material having a first e-module, and
a force take-up axis,
said buffer element being compressible at least in the direction of said force take-up axis,
wherein
at least one additional element having a second e-module is enclosed within said buffer element, said second e-module being larger than said first e-module,
wherein the buffer element is compressible by 80 to 90% in the direction of the force take-up axis,
wherein the additional element is made of such a material that the additional element is deformable to an extent allowing said additional element to follow the deformations of the buffer element when a force is applied,
wherein the additional element has the shape of a frustum of a circular cone, the base surface of the additional element extending orthogonally to the force take-up axis of the buffer element.

2. The buffer according to claim 1, wherein said additional element is elastic.

3. The buffer according to claim 2, wherein the additional element is elastically deformable by 300-700%.

4. The buffer according to claim 1, wherein the buffer element has a first compression module and the additional element has a second compression module, said second compression module being larger than said first compression module.

5. The buffer according to claim 1, wherein the additional element is incompressible in volume.

6. The buffer according to claim 1, wherein the lateral or outer surfaces of the additional element extend at an angle from 20° to 80° relative to force take-up axis of the buffer element.

7. The buffer according to claim 1, wherein the additional element has the shape of a frustum of a right circular cone.

8. The buffer according to claim 1, wherein the additional element has the shape of a hollow frustum of a circular cone.

9. The buffer according to claim 1, wherein least two additional elements, spaced from each other in the longitudinal direction of the buffer element, are enclosed in the buffer element.

10. The buffer according to claim 1, wherein the buffer element is made of foamed plastic material.

11. The buffer according to claim 1, wherein the material of the buffer is volume-compressible and with regard to the volume has an air content of about 50 to 80%.

12. The buffer according to claim 3, wherein the additional element is elastically deformable by 400-600%.

13. The buffer according to claim 6, wherein the lateral or outer surface of the additional element extend at an angle from 30° to 60° relative to force take-up axis of the buffer element.

14. The buffer according to claim 11, wherein the material of the buffer is volume-compressible and with regard to the volume has an air content of about 60 to 70%.

* * * * *